8089X R. B. CHENOWETH.
Plow.
Patented Mar. 17, 1834.
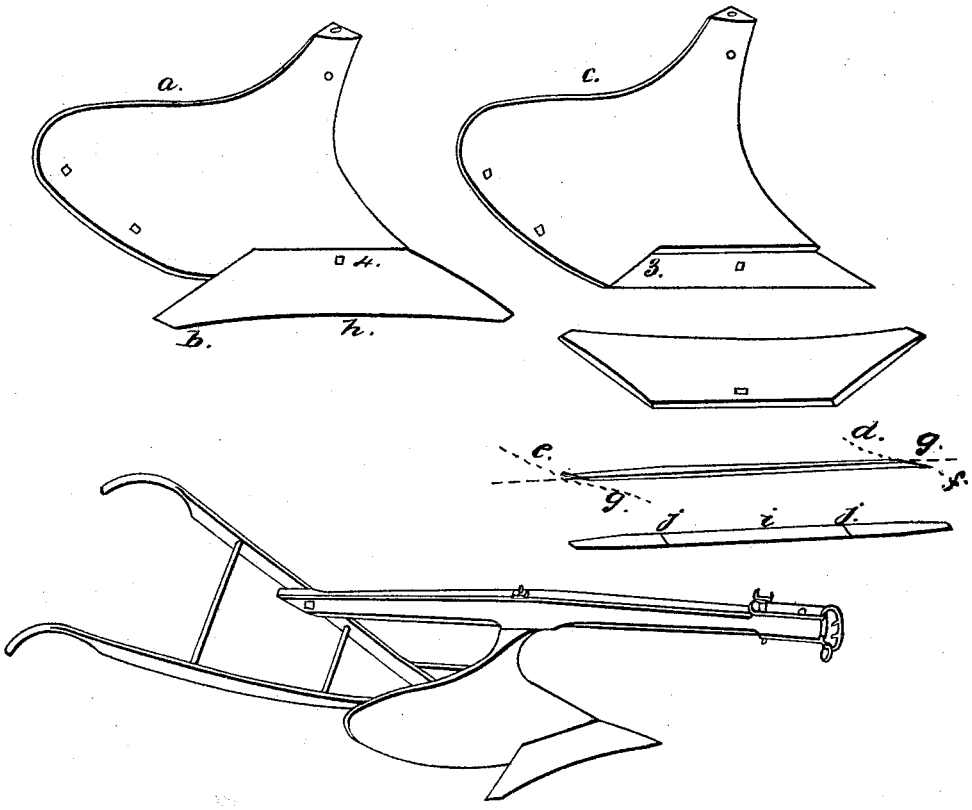
AM. PHOTO-LITHO. CO. N.Y. (OSBORNE'S PROCESS.)

8089X

UNITED STATES PATENT OFFICE.

RICHARD B. CHENOWETH, OF BALTIMORE, MARYLAND.

IMPROVEMENT IN PLOWS.

Specification forming part of Letters Patent dated March 17, 1834.

*To all whom it may concern:*

Be it known that I, RICHARD B. CHENOWETH, of the city of Baltimore and State of Maryland, have invented a new and useful Improvement in Plows; and I do hereby declare that the following is a full and exact description of the construction and operation of the said plow as improved by me.

The improvement consists in the form of the share and the manner of fastening it to the mold-board.

In a former patent I claimed the plan of fastening the share on the top of the mold-board, similar to my present mode; but the share I then used would not admit of a reverse application. My share now embraces both the share and point in one piece. Either side is used up or either end forward, and the wear produces the proper sharpening when the share is turned over. By means of the dovetail fit, as seen at 3 3 in the drawing, where the edge of a share has a hold under a part of the mold-board, one bolt in the middle, as at 4, will hold the share sufficiently firm and secure and render the work both simple and economical.

In the drawing the edge of the share and the points are represented as not on a line with each other, as will be seen by the dotted lines; but the edge and points of the share may be constructed so as to be on the same line. I claim the form of the share as embracing both share and points, and susceptible of a reverse application and self-sharpening by the reversion of such application, with the manner of fastening the share on the mold-board, as represented in the drawing.

I do not mean to confine myself to one precise mode of securing the share to the mold-board, as seen in the drawing, for I am aware that variations of form may be used which may equally well answer the purpose; but I distinctly claim—

The application of the share with two points, and which admits of a reverse application to the mold-board, and which by means of reversing the application sharpens itself by use.

RICHARD B. CHENOWETH.

Witnesses:

JONATHAN PARKER,

BENJM. GORMAN.